(12) United States Patent
D'Hersignerie

(10) Patent No.: US 9,334,882 B2
(45) Date of Patent: May 10, 2016

(54) HYDRAULIC CIRCUIT FOR PROGRESSIVE ENGAGEMENT OF A HYDRAULIC DEVICE

(71) Applicant: POCLAIN HYDRAULICS INDUSTRIE, Verberie (FR)

(72) Inventor: Cyrille D'Hersignerie, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 330 days.

(21) Appl. No.: 13/945,866

(22) Filed: Jul. 18, 2013

(65) Prior Publication Data

US 2014/0020368 A1    Jan. 23, 2014

(30) Foreign Application Priority Data

Jul. 20, 2012 (FR) ...................................... 12 57028

(51) Int. Cl.
| | | |
|---|---|---|
| *F15B 15/00* | (2006.01) | |
| *E02F 9/22* | (2006.01) | |
| *F15B 1/02* | (2006.01) | |
| *F03C 1/08* | (2006.01) | |
| *B60K 6/12* | (2006.01) | |
| *F15B 21/14* | (2006.01) | |

(52) U.S. Cl.
CPC . *F15B 15/00* (2013.01); *B60K 6/12* (2013.01); *E02F 9/2217* (2013.01); *F03C 1/08* (2013.01); *F15B 1/024* (2013.01); *F15B 21/14* (2013.01); *F15B 2211/20569* (2013.01); *F15B 2211/8606* (2013.01); *F15B 2211/8616* (2013.01)

(58) Field of Classification Search
CPC ......... B60K 6/12; E02F 9/2217; F15B 1/024; F15B 21/14; F15B 2211/20569; F15B 2211/8616; F15B 2211/8606; F15B 15/00; Y02T 10/6208; F03C 1/08
USPC .................................................... 60/413, 414
See application file for complete search history.

(56) References Cited

U.S. PATENT DOCUMENTS

| | | | | |
|---|---|---|---|---|
| 4,674,280 A | * | 6/1987 | Stuhr .................. | F16H 61/4096 180/165 |
| 5,134,853 A | * | 8/1992 | Hirata .................. | E02F 9/2225 60/420 |
| 7,891,181 B2 | * | 2/2011 | Baltes ....................... | B66F 9/22 60/414 |
| 8,052,116 B2 | * | 11/2011 | Gray, Jr. .................. | F15B 1/024 251/28 |
| 2010/0300085 A1 | * | 12/2010 | Schmuttermair ........ | B60K 6/12 60/414 |

FOREIGN PATENT DOCUMENTS

| | | |
|---|---|---|
| DE | 1904811 | 9/1969 |
| DE | 3929375 | 3/1991 |
| DE | 102008063594 | 7/2010 |

* cited by examiner

*Primary Examiner* — Dwayne J White
*Assistant Examiner* — Logan Kraft
(74) *Attorney, Agent, or Firm* — Blakely Sokoloff Taylor & Zafman LLP

(57) ABSTRACT

The present invention relates to a hydraulic circuit comprising:
an accumulator (11)
a hydraulic device (1)
a primary line (12) and a secondary line (13) connecting each said accumulator (11) to the hydraulic device (1), the primary line (12) comprising a restriction (14) and a primary distributor (15) adapted to selectively connect the hydraulic device (1) to the accumulator (11) or to a tank (R), the secondary line (13) comprising a secondary distributor (16) alternating between a first configuration in which it blocks the secondary line (13), and a second configuration in which it is passing,
said secondary distributor (16) being controlled via the pressure within the primary line (12) downstream of the primary distributor (15) relative to the hydraulic accumulator (11), such that switching from the first to the second configuration of the secondary distributor (16) takes place only when the pressure in the primary line (12) reaches a threshold value.

5 Claims, 3 Drawing Sheets

HYDRAULIC CIRCUIT FOR PROGRESSIVE ENGAGEMENT OF A HYDRAULIC DEVICE

TECHNICAL DOMAIN OF THE INVENTION

Figure 1:
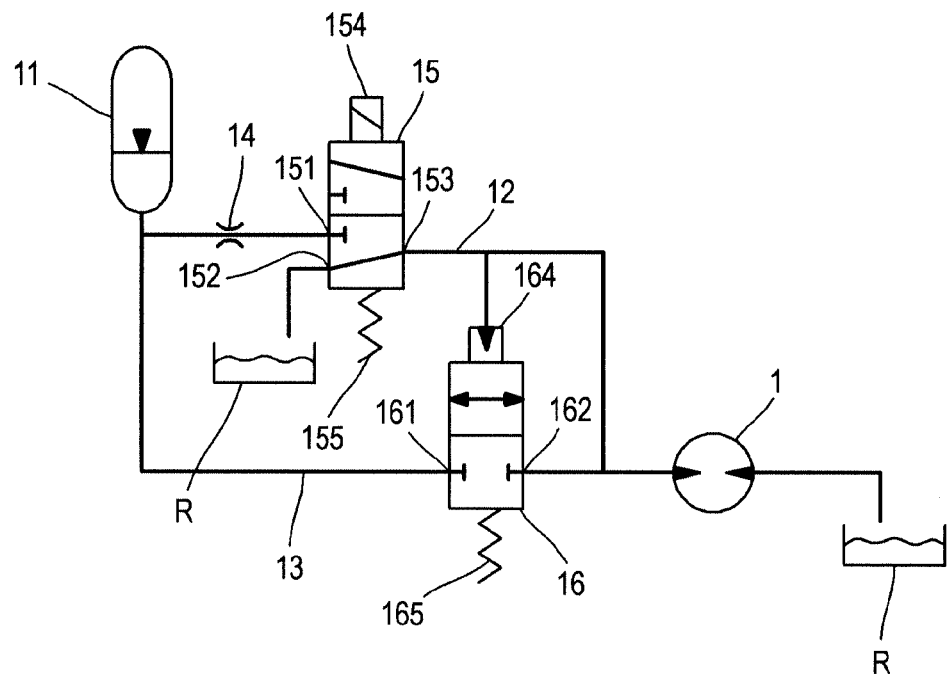

The present invention relates to hydraulic circuits comprising power storage means such as accumulators supplying hydraulic devices.

STATE OF THE ART

Throughout the present text, hydraulic device will designate a device which can function as a motor or a hydraulic pump, and being controlled for example by means of the inclination of a swash-plate of said hydraulic device. A hydraulic device conventionally comprises a plurality of pistons arranged in housings, and executing two-way movements in contact with a cam.

Hydraulic devices having a free-wheel configuration are known, that is, a configuration in which the hydraulic device operates without fluid pressure and more particularly where the pistons are not in contact with the cam, such a configuration for example being advantageous on engines having mixed working conditions. Opposing this free-wheel configuration is the working configuration, in which the pistons are in contact with the cam, and the hydraulic device operates with fluid pressure.

A hydraulic transmission typically comprises a hydraulic device which is in free-wheel configuration when the hydraulic transmission is not stressed, and switches to working configuration when it is stressed.

This switching from the free-wheel configuration to the working configuration is achieved by exiting the pistons out of their respective casings so that the pistons are brought into contact with the cam, or more precisely their free ends are placed in contact with the cam. This switching from the free-wheel configuration to the working configuration is commonly called coupling.

Hydraulic circuits employing accumulators to execute a recovery then power restoration function are known.

Such circuits link one or more accumulators to a hydraulic device, and exploit the considerable output of the combination of accumulators and hydraulic devices to propose energy-efficient systems.

However, the use of hydraulic accumulators affects the shelf life of hydraulic devices. In fact, a hydraulic accumulator immediately delivers its maximal pressure, the effect of which is to suddenly move the pistons of the hydraulic device and cause substantial wear to the contact points between the pistons and the cam or the plate of the hydraulic device as well as loud noise, which is restricting both in terms of usage and in terms of shelf life of the system.

PRESENTATION OF THE INVENTION

The aim of the present invention is to propose a system having no such disadvantages.

For this purpose, the invention proposes a hydraulic circuit comprising:
 a hydraulic accumulator
 a hydraulic device
 a primary line and a secondary line connecting each said accumulator to the hydraulic device,
 the primary line comprising a restriction and a primary distributor adapted to selectively connect the hydraulic device to the accumulator or to a tank at ambient pressure,
 the secondary line comprising a secondary distributor adapted to alternate between a first configuration in which it blocks the secondary line, and a second configuration in which it is passing,
 said secondary distributor being controlled via the pressure within the primary line downstream of the primary distributor relative to the hydraulic accumulator, such that switching from the first to the second configuration of the secondary distributor takes place only when the pressure in the primary line reaches a threshold value.

As a variant, said secondary distributor is kept in its first configuration by return means to opposed by a hydraulic control controlled by the pressure in the primary line, said return means defining the threshold pressure value.

According to another variant said circuit has one or the other of the following characteristics:
 the primary distributor and the restriction are mounted in series, said restriction preferably being upstream of said primary distributor relative to the accumulator, or
 the primary distributor comprises internal conduits dimensioned so as to form the restriction.

The hydraulic device is for example a hydraulic engine with radial pistons.

The invention also proposes a supply process of a hydraulic device by means of a hydraulic accumulator, comprising the following steps:
 supplying the hydraulic device via a primary line fitted with a restriction so as to set a first pressure,
 when the first pressure reaches a threshold value, supplying the hydraulic device via a secondary line so that the accumulator is directly connected to the hydraulic device.

As a variant, setting the first pressure greater than or equal to the threshold value causes control of a distributor in the secondary line from a configuration in which it blocks said secondary line to a configuration in which it is passing.

PRESENTATION OF THE FIGURES

Figure 2:
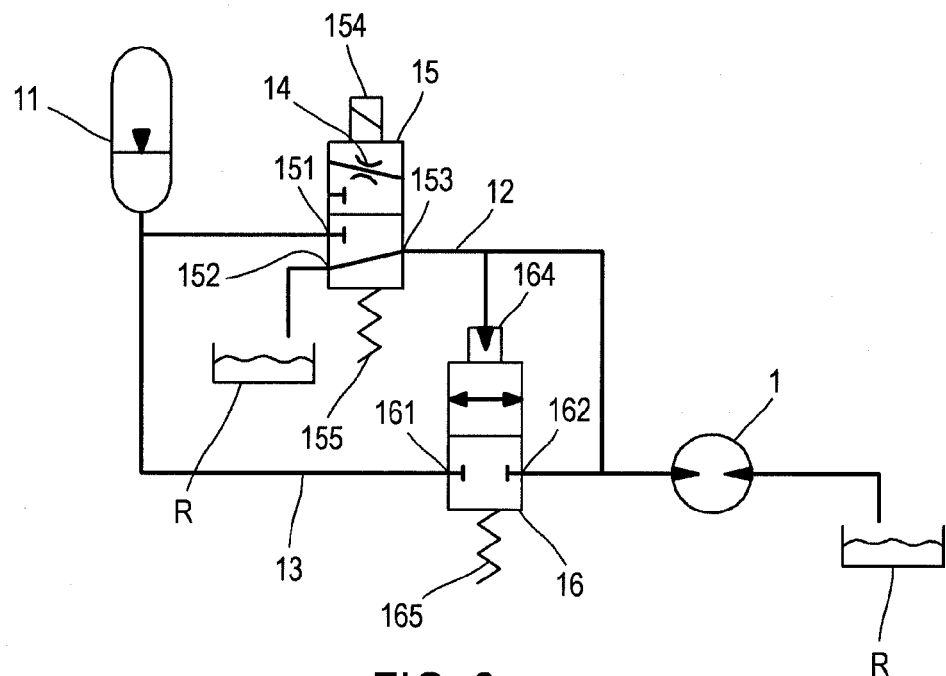
Figure 3:
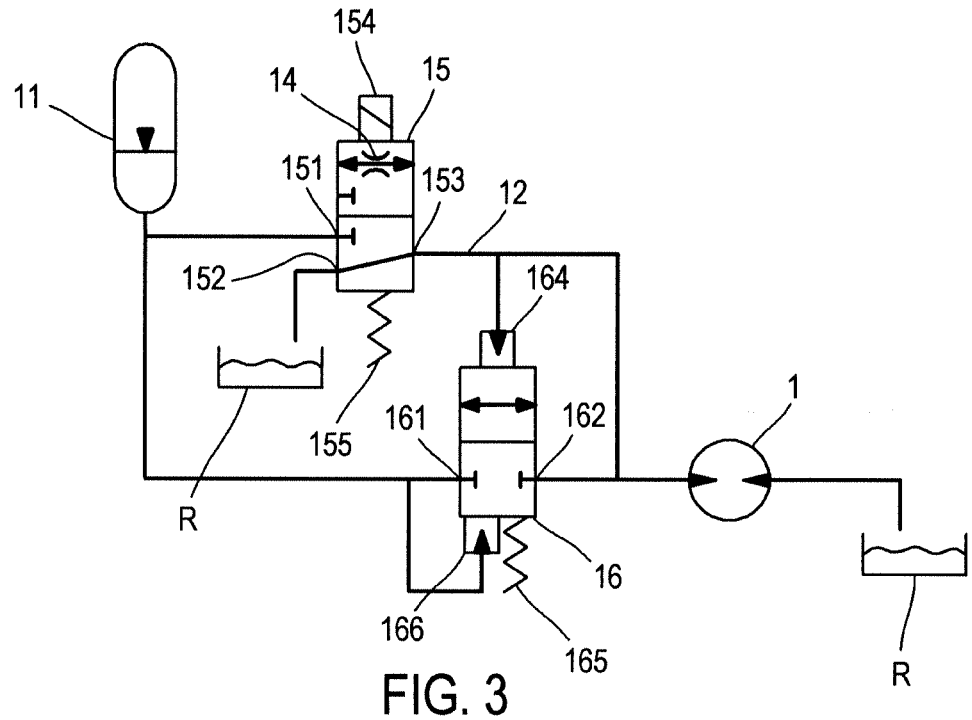
Figure 4:
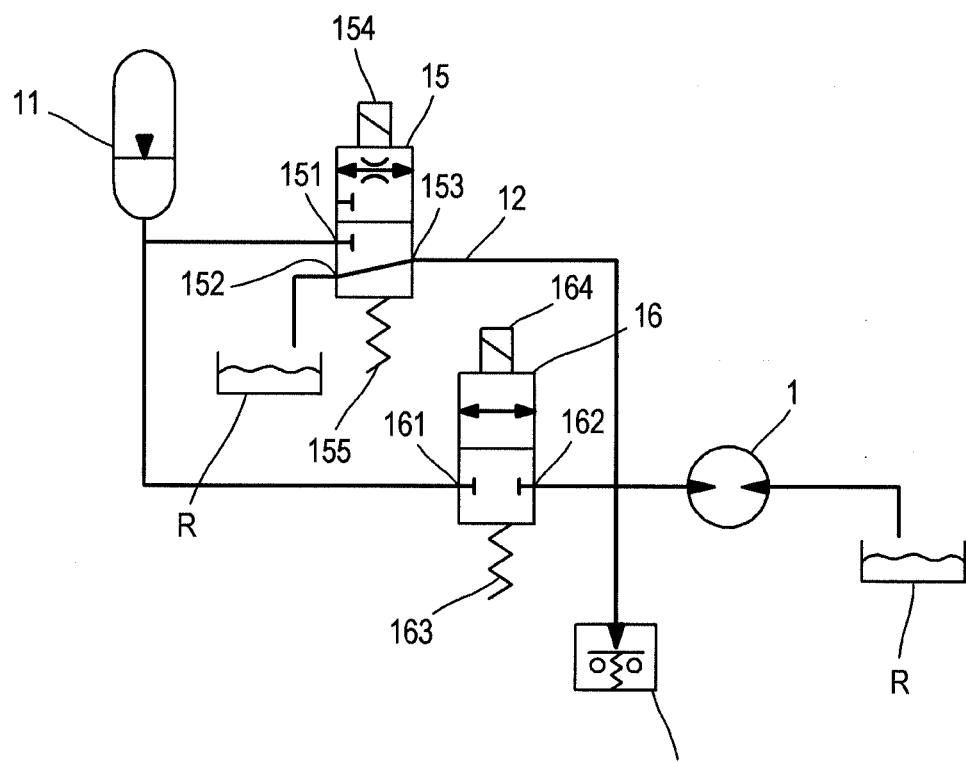
Figure 5:
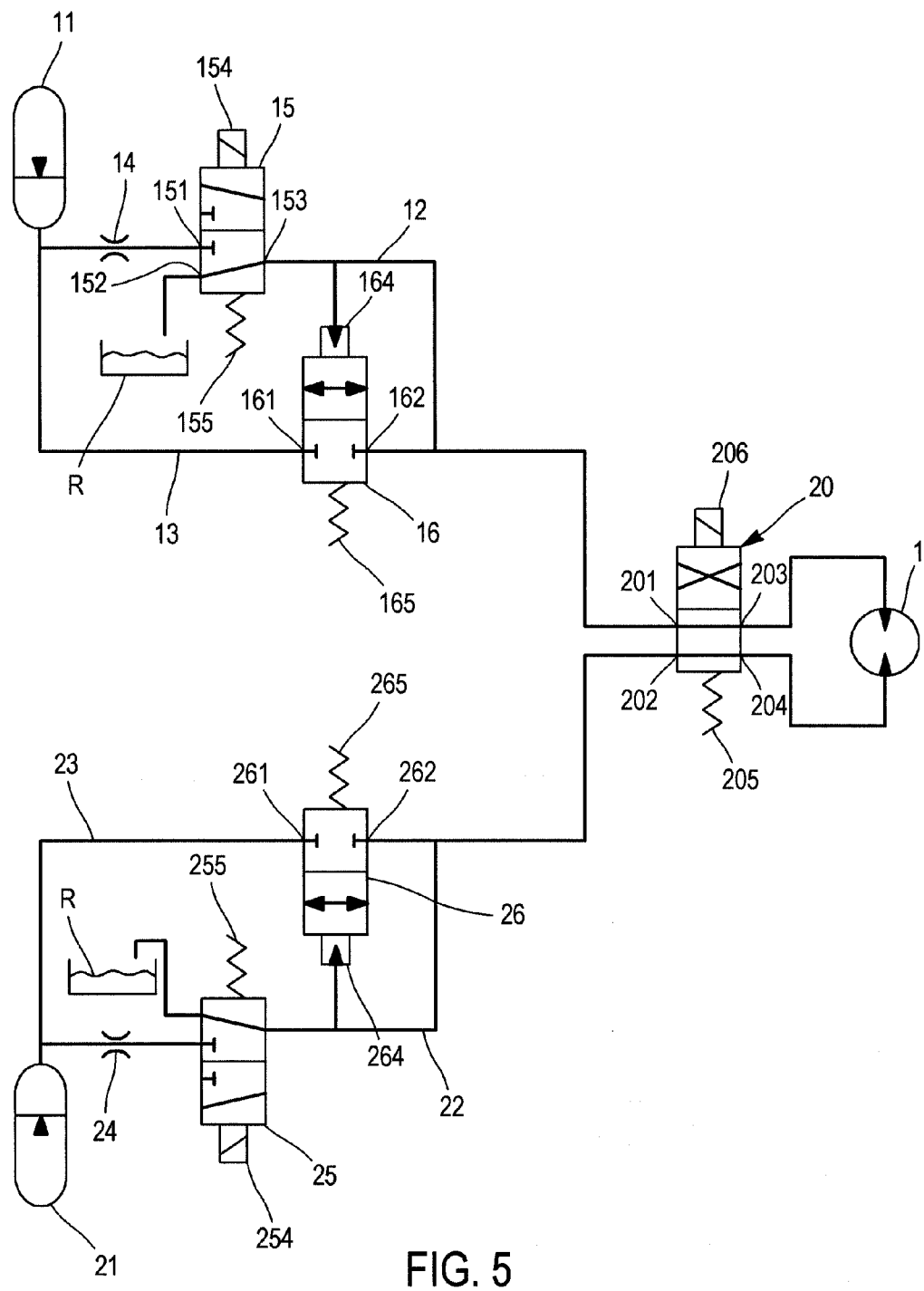

Other characteristics, aims and advantages of the invention will emerge from the following description which is purely illustrative and non-limiting, and which must be viewed in terms of the attached diagrams, in which:

FIG. 1 presents an example of an open hydraulic circuit according to an aspect of the invention, FIG. 2 presents a variant of the embodiment presented in FIG. 1, FIGS. 3 and 4 present two other variants of the embodiment presented earlier, FIG. 5 presents a variant of the circuit presented in FIG. 1 in closed circuit.

In all the figures, common elements are designated by identical reference numerals.

DETAILED DESCRIPTION

FIG. 1 presents an example of part of an open hydraulic circuit according to an aspect of the invention.

In this example, protection or accumulator loading systems are not shown.

The circuit such as presented comprises a hydraulic device 1, typically a hydraulic device with radial pistons, connected both to a tank at ambient pressure R and also to an accumulator 11 via a primary line 12 and a secondary line 13.

The primary line 12 comprises a restriction 14 and a primary distributor 15 adapted to selectively connect the hydraulic device 1 to the accumulator 11 or to a tank at ambient pressure R.

The primary distributor 15 comprises three orifices 151, 152 and 153, connected respectively to the accumulator 11, to the tank at ambient pressure R and to the hydraulic device 1. The primary distributor 15 can alternate between two configurations: a first configuration in which the first orifice 151 is blocked while the second orifice 152 and the third orifice 153 are connected, and a second configuration in which the first orifice 151 and the third orifice 153 are connected while the second orifice 152 is blocked.

Therefore, in its first configuration, the distributor 15 connects the hydraulic device 1 to the tank at ambient pressure R, while in its second configuration the distributor 15 connects the hydraulic device 1 to the accumulator 11.

The primary distributor 15 is controlled by means of a control 154, typically an electric, pneumatic or hydraulic control, opposed by elastic return means 155 which keep the primary distributor 15 by default in its first configuration.

The restriction 14 is for example a flow limiter, a pressure limiter, a fixed or adjustable nozzle or any other adapted means. It is advantageously arranged upstream of the primary distributor 15 relative to the accumulator 11, but can also be arranged downstream of the primary distributor 15 relative to the accumulator 11.

The secondary line 13 comprises a secondary distributor 16 comprising two orifices 161 and 162, adapted to alternate between a first configuration in which its two orifices 161 and 162 are blocked and the secondary distributor 16 cuts the secondary line, and a second configuration in which its two orifices 161 and 162 are connected, and the secondary distributor 16 is therefore passing.

The secondary distributor 16 is controlled by means of a control 164, typically a hydraulic control, opposed by elastic return means 165 which keep the secondary distributor 16 by default in its first configuration. The control 164 applies pressure taken in the primary line 12, downstream of the distributor 15 and of the restriction 14 relative to the accumulator 11, that is, the control 164 applies to the secondary distributor 16 the pressure applied to the hydraulic device 1 via the primary line 12.

The elastic return means 165 of the secondary distributor 16 therefore determine a pressure threshold value in the primary line 12 from which the secondary distributor 16 toggles from its first configuration to its second configuration.

When operating, we consider an initial situation in which the hydraulic device 1 is in free-wheel configuration, that is, a configuration in which the hydraulic device 1 functions without fluid pressure and more particularly still where the pistons are not in contact with the cam or the plate.

When the user wishes to use the hydraulic device 1, that is, to connect it to switch to working configuration, first the control 154 of the primary distributor 15 is actuated so as to set a pressure in the primary line 12. The accumulator 11 unloads in the primary line 12 via the restriction 14 and the primary distributor 15 so as to apply fluid at a limited rate to the hydraulic device 1 due to the presence of the restriction 14.

This first application of pressure to the hydraulic device 1 causes progressive exiting of the pistons which are then supported against the cam or the associated plate.

Once the set of pistons of the hydraulic device 1 is supported against the cam of the hydraulic device 1, if the latter is loaded, the fluid supplied by the accumulator 11 to the hydraulic device 1 in the primary line 12 rises in pressure in the primary line 12.

The pressure in the primary line 12 increases until it reaches the threshold pressure value of pressure defined by the elastic return means 165 from which the secondary distributor 16 toggles from its first configuration to its second configuration.

Switching of the secondary distributor 16 from its first to its second configuration connects the accumulator 11 to the hydraulic device 1 via the secondary line 13 having no restriction and not limiting the rate coming from the accumulator 11 to the hydraulic device 1, and therefore launches the hydraulic device at full speed.

Once the charge of the accumulator 11 is exhausted, or when the control 154 of the primary distributor 15 which returns therefore to its first configuration is cut, the control pressure applied to the secondary distributor 16 via the control 164 will diminish and drop below the threshold value, causing a return of the secondary distributor 16 to its first configuration; the hydraulic device will therefore be connected on either side to the tank at ambient pressure R.

In the case of such an open circuit, a pump (not shown) charges the accumulator 11 by taking fluid from the tank R.

The present invention therefore creates a switching from the free-wheel configuration to the working configuration in two stages, first with application of an incident limited to create exiting of the pistons, which prevents impacts, noise and wear to the pistons and cam or the plate, and retaining a simple structure based on a single accumulator.

Also, in the absence of load caused by the hydraulic device 1, the pressure does not rise in the primary line 12, and consequently the pressure applied by the control 164 does not exceed the threshold value causing toggling of the secondary distributor 16 to its second configuration.

For this, the restriction 14 can be typically dimensioned as a function of the planned speed for progressive exiting of the pistons, which is determined as a function of the volume of oil to be provided to extend the pistons, and of the pressure of the accumulator.

The hydraulic device 11 is therefore supplied only by a low rate flowing through the restriction 14, which limits its rotation speed and avoids deterioration.

For this, the restriction 14 is typically dimensioned so that in the absence of toggling of the secondary distributor 16 to its second configuration and therefore as the secondary line remains cut, the rotation speed of the hydraulic device is limited.

For example, the maximal speed of a motor with radial pistons and with multilobe cam can be of the order of 300 to 500 rpm. This restriction value depends on the cylinder capacity of the hydraulic device, the preferred maximal speed, and the pressure of the accumulator. For example, for a restriction dimensioned for a rate of 2 liters per minute, a 120 cc motor will reach a maximal speed of 16 rpm.

The invention therefore also creates protection for devices turning in case of empty start.

FIG. 2 shows a variant of the embodiment presented in FIG. 1, in which the restriction is integrated in to the primary distributor; the primary distributor comprises internal conduits dimensioned to form the restriction 14.

An additional restriction similar to that presented in FIG. 1 can be added.

The operation is similar to that described in reference to FIG. 1, and therefore will not be explained in more detail here.

FIGS. 3 and 4 present two other variants of the embodiment presented earlier.

In the variant presented in FIG. 3, the secondary distributor 16 is also controlled via a secondary hydraulic control 166 opposing the control 164 in addition to the return force exerted by the return means 165. This particular embodiment of the control of the secondary distributor 16 by the pressure in the primary line 12 triggers the toggling of the secondary distributor 16 when the pressure in the primary line 12, downstream of the primary distributor 15 has reached a given percentage of the pressure upstream of the primary distributor 15, defining the threshold value of pressure defined earlier.

In the variant presented in FIG. 4, the control 164 of the secondary distributor 16 is an electric control, whereof the triggering, and therefore the toggling of the secondary distributor 16 from its first to its second configuration, are controlled by a sensor 156.

This sensor 156 is configured so as to regulate the control 164 when the pressure at which it is connected, in this case the pressure in the primary line 12, downstream of the primary distributor 15, reaches a threshold value.

These two variants presented in FIGS. 3 and 4 therefore present two alternative executions of the control of the secondary distributor 16 by the pressure within the primary line 12.

FIG. 5 presents a closed circuit variant of the circuit presented in FIG. 1.

It is evident that a variant based on the circuit presented in FIG. 2 is also possible.

In the variant illustrated, the hydraulic device 1 is connected on either side to an accumulator, respectively 11 and 21 via a circuit such as presented in FIG. 1.

The same numbering is incremented by a unit over the first figure.

The circuit such as presented executes a power recovery function with progressive switching from the free-wheel configuration to the working configuration of the pistons of the hydraulic device 1 such as detailed earlier in reference to FIG. 1.

To illustrate a working example, it is considered that the accumulator 11 is load at high pressure, while the accumulator 21 is loaded at a lower pressure.

During operation, first the controls 154 and 254 of the primary distributors 15 and 25 are actuated, which causes supply of the hydraulic device by the accumulator 11 via the primary line 12 to interconnect the hydraulic device and avoid impacts and noise as described earlier, the fluid hydraulic then being conveyed to the accumulator 21 via the primary line 23, and loading the accumulator 21. Once the hydraulic device 1 is connected, the pressure rises in the primary line 12 until it reaches the threshold pressure value of pressure from which the secondary distributor 16 toggles from its first configuration to its second configuration.

The accumulator 11 is now connected directly to the hydraulic device 1 via the secondary line 13 having no restriction, and directly supplying the pressure of the accumulator 11 to the hydraulic device 1.

The pressure in the primary line 22 will then rise as a consequence, which will also cause toggling of the secondary distributor 26 when the pressure in the primary line 22 reaches a threshold value, and enable fluid repelled by the hydraulic device 1 to load the accumulator 21 without being limited due to the restriction 24.

The system such as illustrated in FIG. 5 is reversible; once the accumulator 11 is unloaded and the accumulator 21 is loaded, the system can be triggered in the reverse direction by unloading the accumulator 21 and loading the accumulator 11.

The system such as presented in FIG. 5 also comprises an optional cross-parallel distributor 20 for producing transmission still working in the same direction.

This distributor 20 has two orifices 201 and 202 connected respectively to the circuits linked to the accumulators 11 and 21, as well as two orifices 203 and 204 connected to the hydraulic device 1. The distributor 20 can alternate between two configurations under the effect of a control 206 opposed by elastic return means 205:

A first configuration in which the first orifice 201 is connected to the third orifice 203, while the second orifice 202 is connected to the fourth orifice 204, and A second configuration in which the first orifice 201 is connected to the fourth orifice 204 while the second orifice 202 is connected to the third orifice 203.

This distributor 20 therefore reverses the links between the orifices of the hydraulic device and the accumulators 11 and 21 via their respective circuits.

So, once the accumulator 11 is unloaded, the distributor 20 can change configuration, so that the hydraulic device 1 is still being driven in the same direction as when unloading the accumulator 21. In the absence of such a distributor 20, such a system could for example be applied to an alternative machine.

The accumulators 11 and 21 presented in the figures are typically adapted to contain pressurised fluid between 250 and 400 bar.

The pressure threshold toggling value of the secondary distributors 16 and 26 from their first to their second configuration is typically between 10 and 20 bar, for example equal to 10 bar or 20 bar.

The invention such as presented has several advantages, and especially enables protection of the hydraulic device and prevents loud noise during its switching from the free-wheel configuration to the working configuration, as well as protection of the hydraulic device in the event of empty load starting by limiting its rotation speed.

The invention can be applied particularly to power recovery systems using accumulators and for executing a hydrostatic starter for powerful and rapid staring of a motor reliably and without wear.

The invention claimed is:
1. A hydraulic circuit comprising:
a hydraulic accumulator (11, 21)
a hydraulic device (1)
a primary line (12, 22) and a secondary line (13, 23) each connecting said accumulator (11, 21) to the hydraulic device (1), the primary line (12, 22) comprising a restriction (14, 24) and a primary distributor (15, 25) to selectively connect the hydraulic device (1) to one of the accumulator (11, 21) and a tank (R) at ambient pressure,
the secondary line (13, 23) comprising a secondary distributor (16, 26) adapted to alternate between a first configuration in which it blocks the secondary line (13, 23), and a second configuration in which it is passing,
said secondary distributor (16, 26) being controlled via the pressure, which is within the primary line (12, 22) and downstream of the restriction and the primary distributor (15, 25) relative to the hydraulic accumulator (11, 21), such that switching from the first to the second configuration of the secondary distributor (16, 26) takes place only when the pressure in the primary line (12, 22) downstream of the restriction reaches a threshold value, wherein said secondary distributor (16, 26) is held in its first configuration by a return means (165, 265) to which a hydraulic control (164, 264) is opposed controlled by the pressure in the primary line (12, 22), said return means (165, 265) defining said pressure threshold value.

2. The circuit as claimed in claim 1, in which said primary distributor (15, 25) and the restriction (14, 24) are mounted in series, said restriction (14, 24) being upstream of said primary distributor (15, 25) relative to the hydraulic tank (11, 21).

3. The circuit as claimed in claim 1, in which said primary distributor (15, 25) comprises internal conduits dimensioned so as to form the restriction (14, 24).

4. The circuit as claimed in any one of claim 1, in which the hydraulic device (1) is a hydraulic engine with radial pistons.

5. A process for supplying a hydraulic device (1) by means of a hydraulic accumulator (11, 21), comprising the following steps:
- supplying the hydraulic device (1) via a primary line (12, 22) fitted with a restriction (14, 24) so as to set a first pressure, wherein the first pressure is in the primary line and is downstream of the restriction,
- when the first pressure reaches a threshold value, supplying the hydraulic device (1) via a secondary line (13, 23) so that the accumulator (11, 21) is connected directly to the hydraulic device (1),
- wherein setting the first pressure at a value greater than or equal to the threshold value causes the controller (16, 26) in the secondary line (13, 23) to switch from a configuration in which the controller blocks fluid from said secondary line (13, 23) to a configuration in which the controller passes fluid flow from said secondary line.

\* \* \* \* \*